United States Patent [19]

Jacobsson

[11] Patent Number: 5,050,841
[45] Date of Patent: Sep. 24, 1991

[54] QUICK COUPLING INCLUDING SPHERICAL VALVE

[75] Inventor: Rolf A. Jacobsson, Saltsjö-Boq, Sweden

[73] Assignee: Atlas Copco Tools AB, Stockholm, Sweden

[21] Appl. No.: 545,370

[22] Filed: Jun. 28, 1990

[30] Foreign Application Priority Data

Jun. 29, 1989 [SE] Sweden .................................. 8902387

[51] Int. Cl.$^5$ ............................................. F16L 37/28
[52] U.S. Cl. .................................... 251/149.9; 285/18
[58] Field of Search ................. 251/149.3, 149.9, 89.5; 285/18

[56] References Cited

U.S. PATENT DOCUMENTS

| 2,493,271 | 1/1950 | Smith et al. | 284/18 |
| 3,589,673 | 6/1971 | Cruse | 251/149.9 |
| 4,662,396 | 5/1987 | Avnon | 137/616.7 |

FOREIGN PATENT DOCUMENTS

| 0186614 | 7/1986 | European Pat. Off. |
| 1265515 | 4/1968 | Fed. Rep. of Germany |

Primary Examiner—Martin P. Schwadron
Assistant Examiner—Kevin L. Lee
Attorney, Agent, or Firm—Frishauf, Holtz, Goodman & Woodward

[57] ABSTRACT

A rotary valve type quick coupling for interconnecting two pressure medium conduits comprises a coupling unit (10) including a casing (14) and a spherical rotary valve element (18) formed with a socket (27), and a tubular connector nipple (12) adapted to be guidingly received in the socket (27). An elongate aperture (32) is provided in the casing (14) which permits the connector nipple (12) to be introduced into the valve element socket (27) and to be rotated conjointly with the valve element (18) between a connect/disconnect position and a connected position. A transverse annular shoulder (46) on the nipple (12) is arranged to engage a guide surface (45) on the casing (14) to guide the nipple (12) and the valve element (18) as they occupy the connect/disconnect position.

2 Claims, 3 Drawing Sheets

QUICK COUPLING INCLUDING SPHERICAL VALVE

BACKGROUND OF THE INVENTION

This invention relates to a rotary valve type quick coupling for interconnecting two pressure medium conduits.

In particular, the invention concerns a quick coupling of the above type comprising a coupling unit including a casing and a spherical rotary valve element formed with a socket, and a tubular connector nipple adapted to be guidingly received in the valve element socket. An elongate aperture in the casing permits the connector nipple to be introduced into the valve element socket and to be rotated conjointly with said valve element between a connect/disconnect position and a connected position.

A quick coupling of the above described type is previously shown in DE-AS 1 265 515. When using a spherical valve element, as in the coupling illustrated in this publication, there is a problem in guiding the valve element such that the introduction and disconnection of the connector nipple may be carried out smoothly. A condition is that there is a proper alignment between the socket in the valve element and the aperture in the coupling unit casing.

In the prior art coupling referred to above, the alignment problem is solved by having a spring biassed sleeve enter the opening (See FIG. 1 in DE-AS 1 265 515). This sleeve also serves as a safety lock means to prevent unintentional disconnection of the coupling in the connected position (See FIG. 2).

As being apparent from the drawing figures, this prior art solution to the alignment problem is constructively complicated, expensive in manufacturing and results in a rather awkward handling.

SUMMARY OF THE INVENTION

The main object of the invention is to accomplish a quick coupling of the rotary valve type in which an improved and simplified guide means guarantees a proper alignment between the valve socket and the aperture in the coupling casing in the connect/disconnect position.

According to the present invention, a rotary valve type quick coupling for interconnecting two pressure medium conduits comprises a coupling unit including a casing and a spherical rotary valve element formed with a socket; and a tubular connector nipple which is guidingly received in the socket. An elongated aperture in the casing is provided for permitting the connector nipple to be introduced into the socket and to be rotated jointly with the valve element between a connect/disconnect position and a connected position. A first transverse annular shoulder is provided on the connector nipple and is arranged to engage in the connected position a peripheral lock ridge on an inner edge of the aperture for axial locking of the connector nipple relative to the casing, the connector nipple having a second transverse annular shoulder facing the first transverse annular shoulder. The casing has an outer guide surface partially surrounding the elongated aperture and arranged to cooperate with the second transverse annular shoulder as the connector nipple is fully introduced in the valve element socket in the connect/disconnect position, to thereby guide the connector nipple and the valve element in the connect/disconnect position.

Further objects and advantages of the invention will appear from the following specification and claims.

A preferred embodiment of the invention is hereinbelow described in detail with reference t the accompanying drawings.

DETAILED DESCRIPTION

Figure 1:
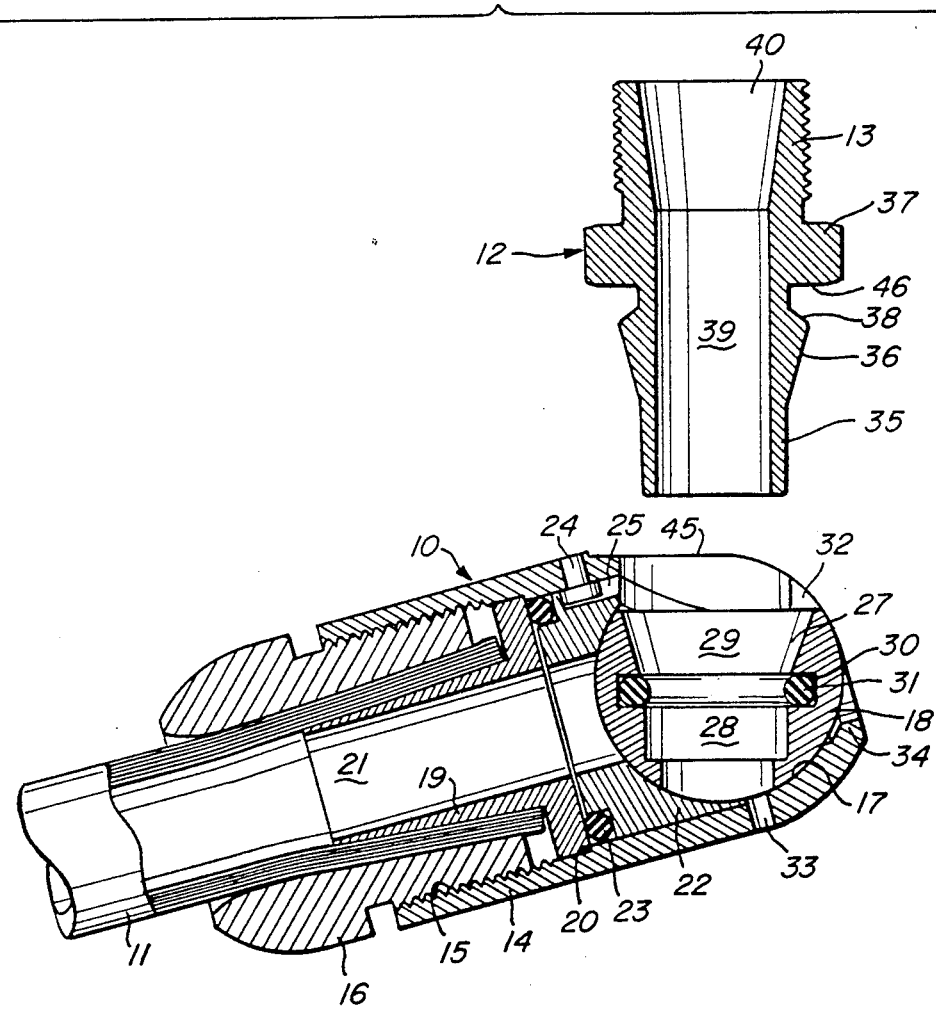
FIG. 1 shows a longitudinal section through a quick coupling according to the invention when occupying a disconnected and closed position.

The quick coupling shown in the drawing figures comprises a coupling and valve unit 10 for connection to a pressure air supply hose 11 and a connector nipple 12 for interconnection with the unit 10. The connector nipple 12, which is formed with a threaded outlet end 13, is intended to be connected either to another hose or directly to the pressure air inlet passage of a power tool, which is the most common application.

The coupling unit 10 comprises a tubular casing 14 which at its one end has a female thread 15 for cooperation with a hose clamping nut 16 and which at its opposite end has a spherical seat 17 for guidingly supporting a ball shaped valve element 18. A conical sleeve 19 to be introduced into the end of the hose 11 rests against a shoulder 20 in the casing 14. The inner bore of the sleeve 19 forms the main part of the through flow passage 21 of the coupling unit 10.

A bearing element 22 for sealing cooperation with the valve element 18 is supported axially against the sleeve 19, and a resilient O-ring 23 located therebetween serves not only to seal off the bearing element 22 relative to the casing 14 but exerts an axial bias force on the bearing element 22 to ensure a proper sealing contact between the latter and the valve element 18. A stud 24 mounted in the casing 14 is received in a slot 25 in the bearing element 22 to prevent rotation of the latter.

The valve element 18 is formed with a diametrically extending socket 27 which comprises a cylindrical section 28 and a conical section 29. Between these sections there is provided an annular groove 30 for lodging a seal ring 31.

The conical outer section 29 of the socket 27 is open toward the outside of the coupling casing 14 via an elongate crest-shaped aperture 32 for introduction, turning and locking of the connector nipple 12. The cylindrical inner section 28 on the other hand communicates with the flow passage 21 of the coupling unit 10 or a vent opening 33, alternatively.

The connector nipple 12 has an inlet end which is formed to fit the socket 27 of the valve element 18. This inlet end comprises an outer cylindrical portion 35 to be received in the cylindrical socket section 28 of the valve element 18 and a conical portion 36 for cooperation with the conical section 29. The nipple 12 also has a hexagonal spanner grip portion 37, and between the conical section 29 and the grip portion 37 there is formed a conical shoulder 38 for engagement with a peripheral lock ridge 34 on the inner edge of the aperture 32 for locking the connector nipple 12 against disconnection when rotated to the straight, open position relative to the casing 14.

Inside, the inlet end of the nipple 12 comprises a cylindrical bore 39 of the same diameter as the flow passage 21 of the coupling unit 10, and at its outlet end 13 the nipple 12 has a conically diverging outlet portion 40.

Partially surrounding the crest formed aperture 32 there is a guide surface 45 which is arranged to cooperate with a flat annular shoulder 46 on the nipple 12 as the latter occupies the connect/disconnect position. See FIG. 2 and 3. The shoulder 46 extends perpendicularly to the longitudinal axis of the nipple 12 and is formed by an end surface of the spanner grip portion 37.

Figure 2:
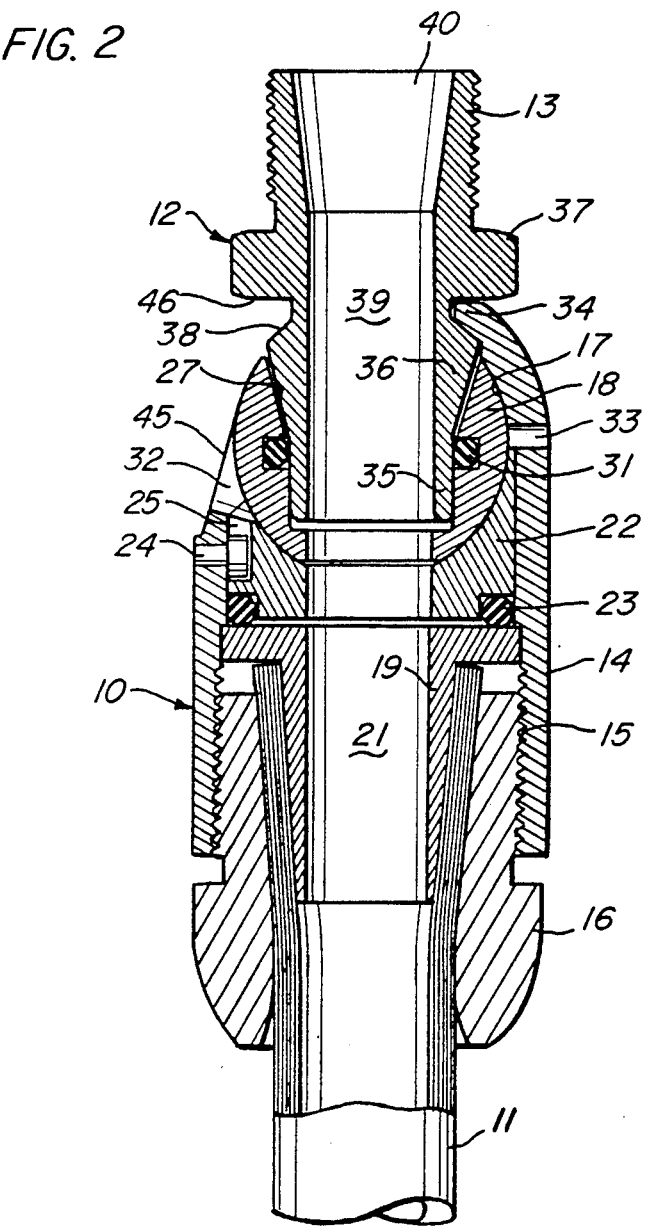
FIG. 2 shows the quick coupling in its interconnected open position.
Figure 3:
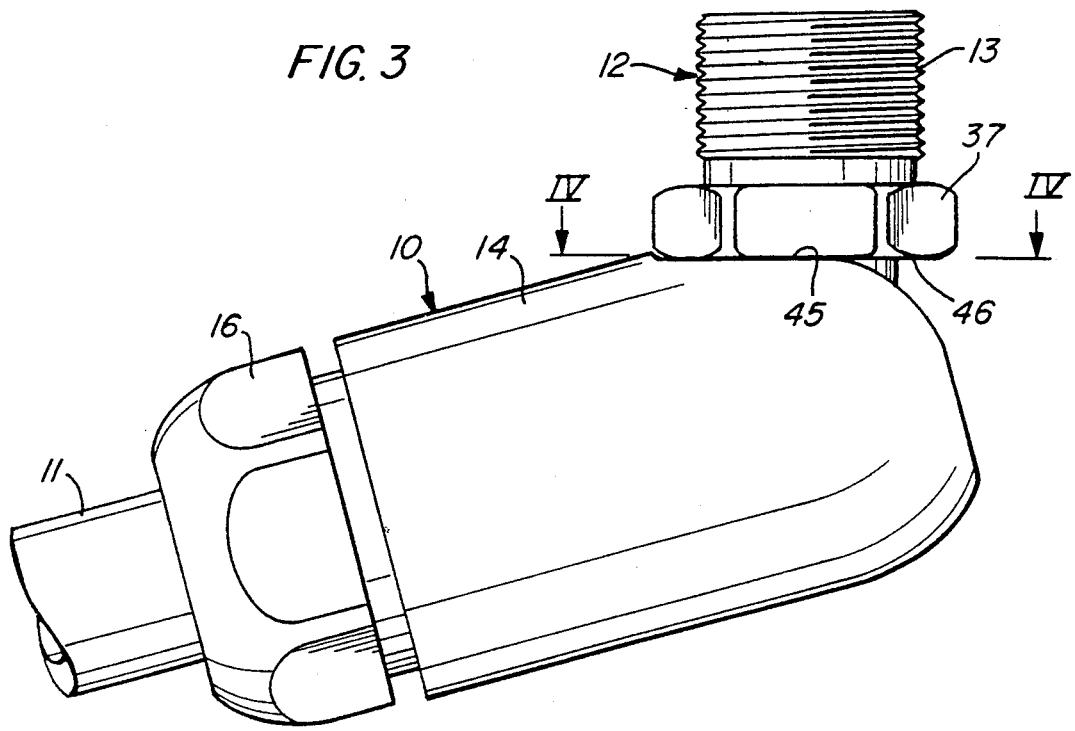
FIG. 3 shows a side view of the quick coupling of FIG. 1 when occupying its connect/disconnect position.
Figure 4:
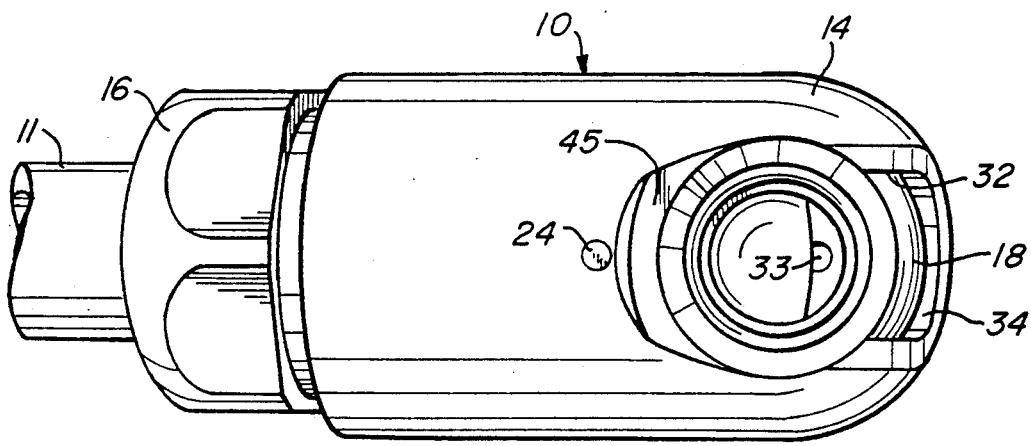
FIG. 4 shows a view of the coupling and valve unit with the connector nipple removed.

Due to the fact that the valve element 18 is spherical in shape there is no natural guide means to prevent rotation in other directions than the one necessary to shift the valve element 18 between the connect/disconnect position (FIG. 1) and the connected position (FIG. 2). By the above described guide surface arrangement there is accomplished a very simple but yet effective guide means for ensuring a correct position of the nipple 12 and the valve element 18 in the connect/disconnect position. A misalignment between the nipple 12 and ball valve 18 on one hand and the aperture 32 on the other hand would make connection and disconnection of the coupling rather difficult.

I claim:

1. A rotary valve type quick coupling for interconnecting two pressure medium conduits, comprising:

a coupling unit (10) including a casing (14) and a spherical rotary valve element (18) formed with a socket (27);

a tubular connector nipple (12) which is guidingly received in said socket (27);

an elongated aperture (32) in said casing (14) permitting said connector nipple (12) to be introduced into said socket (27) and to be rotated jointly with said valve element (18) between a connect/disconnect position and a connected position; and a first transverse annular shoulder (38) on said connector nipple (12) arranged to engage in said connected position a peripheral lock ridge (34) on an inner edge of said aperture (32) for axial locking of said connector nipple (12) relative to said casing (14);

said connector nipple (12) having a second transverse annular shoulder (46) facing said first transverse annular shoulder (38); and said casing (14) having an outer guide surface (45) partially surrounding said elongated aperture (32) and arranged to cooperate with said second transverse annular shoulder (46) as said connector nipple (12) is fully introduced in said valve element socket (27) in said connect/disconnect position, to thereby guide said connector nipple (12) and said valve element (18) in said connect/disconnect position.

2. The coupling according to claim 1, wherein said second transverse annular shoulder (46) on said connector nipple (12) forms part of a hexagonal wrench grip portion (37).

* * * * *